(No Model.)  3 Sheets—Sheet 1.

C. S. TILTON.
MACHINE FOR MANUFACTURING CARRIAGE WHEEL HUBS.

No. 244,097.  Patented July 12, 1881.

Witnesses
S. N. Piper

Inventor.
Charles S. Tilton
by R. H. Eddy atty.

(No Model.) 3 Sheets—Sheet 2.
C. S. TILTON.
MACHINE FOR MANUFACTURING CARRIAGE WHEEL HUBS.
No. 244,097. Patented July 12, 1881.
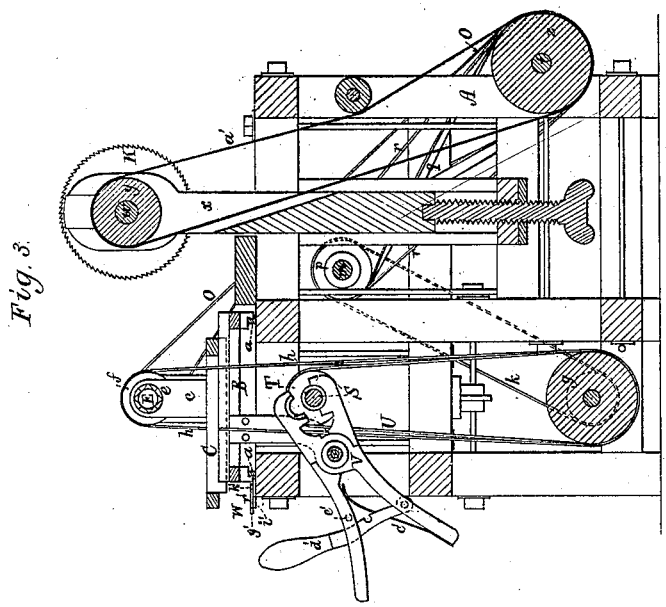
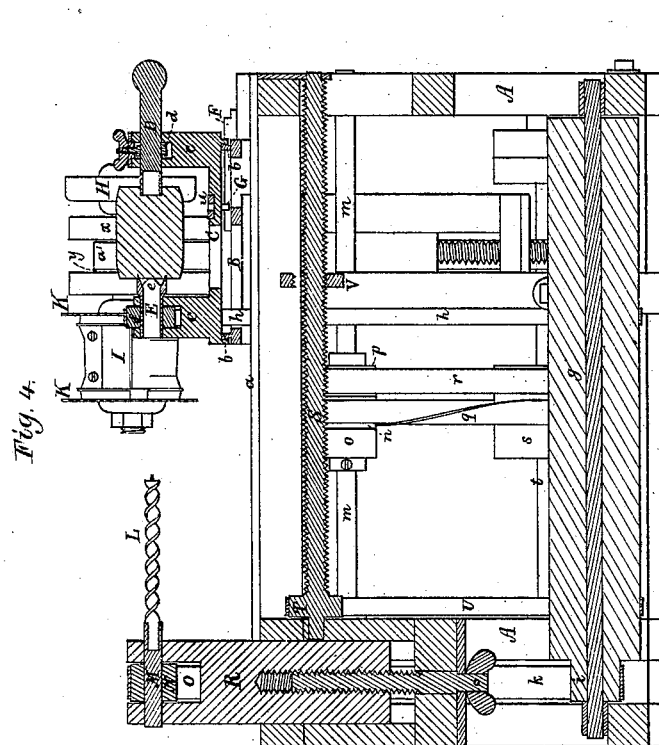
Witnesses
S. N. Piper
Inventor,
Charles S. Tilton
by R. H. Eddy atty.

(No Model.)  3 Sheets—Sheet 3.

C. S. TILTON.
MACHINE FOR MANUFACTURING CARRIAGE WHEEL HUBS.

No. 244,097.  Patented July 12, 1881.

Witnesses.
J. N. Piper
C. B. Pratt

Inventor
Charles S. Tilton.
by R. H. Eddy atty.

UNITED STATES PATENT OFFICE.

CHARLES S. TILTON, OF PITTSFIELD, NEW HAMPSHIRE, ASSIGNOR TO CHARLES B. LANCASTER, OF NEWTON, MASSACHUSETTS, AND IRA N. BLAKE, OF PITTSFIELD, NEW HAMPSHIRE.

MACHINE FOR MANUFACTURING CARRIAGE-WHEEL HUBS.

SPECIFICATION forming part of Letters Patent No. 244,097, dated July 12, 1881.

Application filed May 18, 1881. (No model.)

*To all whom it may concern:*

Be it known that I, CHARLES S. TILTON, of Pittsfield, of the county of Merrimack and State of New Hampshire, have invented a new and useful Machine for Manufacturing Carriage-Wheel Hubs; and I do hereby declare the same to be described in the following specification and represented in the accompanying drawings, of which—

Figure 1:
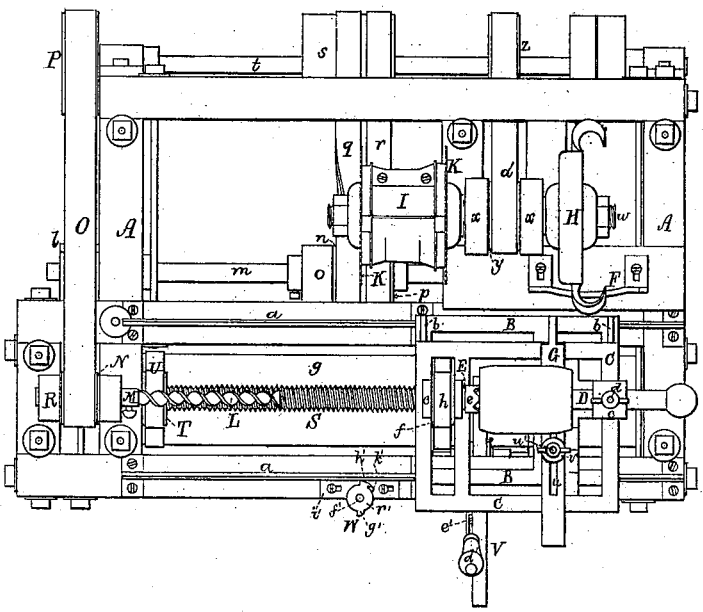
Figure 2:
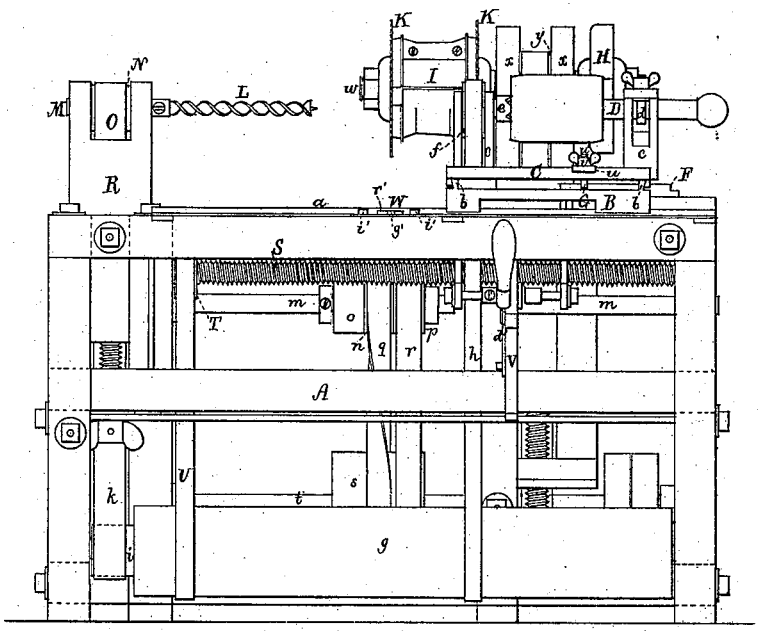
Figure 5:
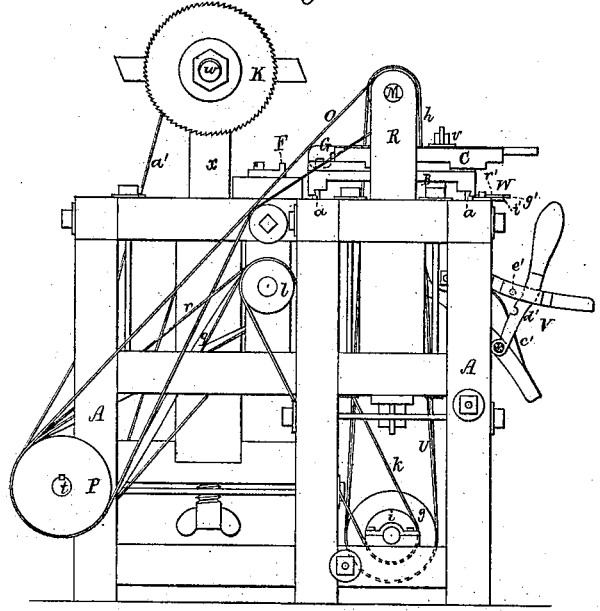

Figure 1 is a top view, Fig. 2 a front elevation, and Fig. 3 a transverse section, of it. Fig. 4 is a longitudinal section of it, such section being taken through the boring and tubular arbors and center, to be hereinafter described. Fig. 5 is an end elevation of the machine, such machine being to perform the operations of rough-shaping a wheel-hub blank, boring it for reception of the box, finishing it peripherally, and cutting or reducing it to the requisite length.

In the drawings, A denotes the main frame, having on its upper surface two parallel rails, $a\ a$, upon which is placed, and adapted to them so as to be guided rectilinearly by them while it is being moved, a main platform or carriage, B, having projecting upward from it two straight and parallel rails, $b\ b$, arranged to stand at right angles to the rails $a\ a$. Upon the said rails $b\ b$, and adapted to them so as to be guided by them rectilinearly, is a second or auxiliary carriage, C, which has projecting up from it two standards, $c\ c$, one of which carries an adjustable and tubular center, D, which is movable lengthwise in the standard, the latter carrying a screw-clamp, $d$, to confine the center in position. The other standard supports a tubular arbor, E, provided at its inner end with a chuck, $e$, and also having a driving-pulley, $f$, about which and a long drum, $g$, arranged in the frame A in manner as shown, is an endless belt, $h$.

At one end of the drum is a pulley, $i$, about which and another pulley, $l$, is an endless belt, $k$. The pulley $l$ is fixed on a shaft, $m$, arranged as shown, and carrying a fast pulley, $n$, and two loose pulleys, $o\ p$. Endless belts $q\ r$ go around the pulleys $n\ p$ and a drum or pulley, $s$, fixed on a driving-shaft, $t$. The said belts $q\ r$, one of which is a crossed belt, are to have in practice a suitable "shipper" to move them simultaneously, so as to throw either upon the loose pulley and the other on a contiguous fast pulley, such being in order to cause the drum $g$ to be revolved in either direction, as occasion may require.

Upon the top of the frame is a fixed guide or rough-shaping rail or guide, F, which is spanned by the prongs of an adjustable fork, G, such fork being adapted to the carriage C, so as to be guided and movable rectilinearly thereon. The fork is slotted lengthwise, as shown at $u$, to receive a clamp-screw, $u'$, which projects upward from the carriage, and is provided with a nut, $v$. By means of the fork and its clamping devices the carriage C can be adjusted to the proper distance from the rough-shaping cutter-wheel H for it to reduce the hub-blank to the proper shape and diameter for it to be completed peripherally by the finishing cutter-wheel I. The two cutter-wheels H and I are carried by one shaft, $w$, supported by a standard, $x$, and provided with a driving-pulley, $y$, about which and another and larger pulley, $z$, fixed on the main driving-shaft $t$, runs an endless belt, $a'$, such being for effecting the rotary motion of the two cutter-wheels.

The cutter-wheel I is disposed between two circular saws, K K, which are fixed on the shaft $w$, and are revolved with and by it. These saws are to reduce the turned hub to its proper length.

Besides the devices hereinbefore particularly described, there is to the machine mechanism for boring the hub axially for reception of a journal-box, or otherwise. This mechanism consists of an auger or boring-tool, L, its carrying-arbor M, pulley N, endless belt O, and driving-pulley P arranged as represented, the pulley N being fixed on the arbor M, and the pulley P being fixed on the driving-shaft $t$. The arbor M is supported in a standard, R, arranged in the frame A in manner as represented.

For automatically moving the carriage B a rotary screw, S, is used, it being arranged as shown and provided with a pulley, T, about which and the long drum $g$ is an endless belt, U.

Tongs V, pivoted to the carriage B and having female screw-threads in their jaws to engage with the screw S, are provided with a spring, $c'$, for opening them, the said jaws. These tongs also have a latching-lever, $d'$, properly adapted to them for holding the jaws closed upon the screw, such lever arranged as represented, it being fulcrumed to one arm of the tongs, and notched to receive or catch upon a stud, $e'$, carried by the other arm of such tongs.

Arranged on the frame A (or a plate, $i'$, fixed thereto) in manner as shown is the tripper W, which consists not only of a disk, $r'$, arranged to turn horizontally on a fixed stud, $F'$, but of two projections, $g'$ $h'$, formed and projecting from such disk in manner as represented. There is also to the support-plate $i'$ of the tripper a stud, $k'$, against which either projection can abut, on the tripper being turned around sufficiently therefor. This tripper is for unlatching the tongs at the proper time to stop the carriage directly in front of the rotary finishing-wheel. This is accomplished by setting the tripper so that its hooked projection shall be against the stud, in which case the other or cam-shaped projection will be in position for the latch of the tongs, when moved against it, to be forced by it out of engagement with the stud $e'$. Preparatory to boring the hub the tripper is to be turned so as to carry the cam-projection out of the path of movement of the said latch.

In using the machine the boring of the blank may be done either before or after the rough-shaping and finishing of it, in which case the circular saws may be of a diameter to cause the blank to be cut down to the bore; but in case the boring of the blank is effected after the rough-shaping and finishing of it, the saws should not cut quite down to the bore. After having chucked the blank, or properly fixed it to the arbor-chuck or center, by which it is supported while being reduced, the tongs are to be engaged with the long screw, which, being in revolution, will cause the carriage B and the parts over it to be moved endwise, so as to carry the blank against the rough-shaping cutter-wheel. The blank, while revolving and passing along, will be rough-shaped by such wheel, and by the action of the guide F and fork G. This having been accomplished, and the blank having arrived directly in front of the finishing cutter-wheel, the endwise movement of the carriage B will be arrested. The carriage C is next to be advanced, so as to carry the blank up to the saws, and the finishing-wheel, which, being in rapid revolution, will, as the blank continues to revolve, finish it and sever, or partially sever, the hub portion from the rest of the blank.

I claim as my invention in the machine as described the following, viz:

1. The combination of the rough-shaping and the finishing cutter-wheels H I, and the cutting-off saws K K, provided with mechanism for operating them, as described, with the shaping-guide F, fork G, main and auxiliary carriages B C, their hub-blank-supporting center D, and tubular arbor E, and the boring-arbor M, provided with the boring-tool L, the main carriage B, and tubular and boring arbors, having mechanism for operating them, substantially as set forth.

2. The combination of the tripper W and its stud $k'$ applied to the frame A, as described, with the screw-connecting tongs V, provided with the spring $c'$ and latching-lever $d'$, and applied to the main carriage B and its operative screw S, all being substantially as set forth.

CHARLES S. TILTON.

Witnesses:
AARON WHITTEMORE, Jr.,
GEO. A. S. KIMBALL.